US012270527B2

(12) United States Patent
Nelson et al.

(10) Patent No.: US 12,270,527 B2
(45) Date of Patent: Apr. 8, 2025

(54) POLE MOUNTED LANTERN

(71) Applicant: Devos, LLC, Springville, UT (US)

(72) Inventors: Chris Nelson, Provo, UT (US); Richard Smith, Spanish Fork, UT (US)

(73) Assignee: Devos, LLC, Springville, UT (US)

( * ) Notice: Subject to any disclaimer, the term of this patent is extended or adjusted under 35 U.S.C. 154(b) by 0 days.

(21) Appl. No.: 18/765,909

(22) Filed: Jul. 8, 2024

(65) Prior Publication Data

US 2024/0360983 A1 Oct. 31, 2024

Related U.S. Application Data

(63) Continuation of application No. 18/434,513, filed on Feb. 6, 2024, now Pat. No. 12,031,698.

(60) Provisional application No. 63/443,844, filed on Feb. 7, 2023.

(51) Int. Cl.

| | |
|---|---|
| ***F21V 15/01*** | (2006.01) |
| ***F21V 21/06*** | (2006.01) |
| ***F21V 21/22*** | (2006.01) |
| ***F21V 31/00*** | (2006.01) |
| ***F21W 131/10*** | (2006.01) |
| ***F21Y 115/10*** | (2016.01) |

(52) U.S. Cl.

CPC .............. *F21V 15/01* (2013.01); *F21V 21/06* (2013.01); *F21V 21/22* (2013.01); *F21V 31/005* (2013.01); *F21W 2131/10* (2013.01); *F21Y 2115/10* (2016.08)

(58) Field of Classification Search

CPC .......... F21S 8/08–088; F21S 9/00–046; F21V 15/00–04; F21V 21/06; F21V 21/22; F21V 31/00–005; F21W 2131/10; F21Y 2115/10

See application file for complete search history.

(56) References Cited

U.S. PATENT DOCUMENTS

| | | | |
|---|---|---|---|
| D623,786 | S | 9/2010 | Wessek |
| D776,323 | S | 1/2017 | Oh |
| 9,605,816 | B2 | 3/2017 | Lin et al. |
| D844,872 | S | 4/2019 | Krantz et al. |
| D868,331 | S | 11/2019 | Li |
| D890,400 | S | 7/2020 | Chen |
| 11,181,260 | B2 | 11/2021 | Nurmi et al. |

(Continued)

FOREIGN PATENT DOCUMENTS

| | | |
|---|---|---|
| CN | 215569865 | 1/2022 |

OTHER PUBLICATIONS

Design U.S. Appl. No. 29/776,417, filed Mar. 30, 2021.

(Continued)

*Primary Examiner* — Jason M Han

(74) *Attorney, Agent, or Firm* — Thorpe North & Western, LLP

(57) ABSTRACT

A pole mounted lantern comprises a lantern housing mounted on a top of a pole. A battery is located in the lantern housing. Light emitting diodes (LEDs) are located inside of the lantern housing and electrically coupled to the battery. A lens is associated with the lantern housing and circumscribes the LEDs. The lens is at least light translucent. A connector is on the top of the lantern housing. An accessory is releasably mounted to the top of the lantern housing. A mating connector of the accessory is releasably engaging the connector of the lantern housing.

20 Claims, 12 Drawing Sheets

(56) References Cited

U.S. PATENT DOCUMENTS

| | | | |
|---|---|---|---|
| D968,666 S | 11/2022 | Tengjie | |
| 11,652,021 B2 | 5/2023 | Maier | |
| 11,725,807 B2 | 8/2023 | Harvey et al. | |
| D1,002,046 S | 10/2023 | Cheng | |
| D1,002,896 S | 10/2023 | Wu | |
| D1,010,186 S | 1/2024 | Wu | |
| D1,010,900 S | 1/2024 | Zhang | |
| 12,031,698 B1 | 7/2024 | Nelson et al. | |
| 2015/0338040 A1* | 11/2015 | Swope .................... | F21S 9/037<br>362/183 |
| 2023/0408071 A1 | 12/2023 | Zeitler et al. | |

OTHER PUBLICATIONS

Design U.S. Appl. No. 29/927,853, filed Feb. 6, 2024.

Devos Outdoor, LightRanger 1200 LED Lantern. First available circa 2021. Searched on Aug. 18, 2024. [https://www.devosoutdoor.com/products/lightranger] (Year: 2021).

Devos Outdoor, LightRanger 800. First available Aug. 31, 2023. Searched on Aug. 18, 2024. [https://www.amazon.com/ Devos-LightRanger-800-Rechargeable-Telescoping/dp/BOC H 1 M5 H Q9/] (Year: 2023).

Hoto, Camping Light. First available circa 2023. Searched on Aug. 18, 2024. [https://hototools.com/products/hoto-camplight] ( Year: 2023).

* cited by examiner

POLE MOUNTED LANTERN

PRIORITY CLAIM(S) AND RELATED APPLICATION(S)

This is a continuation of U.S. patent application Ser. No. 18/434,513, filed Feb. 6, 2024, now U.S. Pat. No. 12,031,698; which claims priority to U.S. Provisional Patent Application Ser. No. 63/443,844, filed Feb. 7, 2023; which are hereby incorporated herein by reference.

BACKGROUND

Various different flashlights and lanterns have been proposed. It can often be difficult to direct light to an area where light is needed. Providing portable light solutions is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
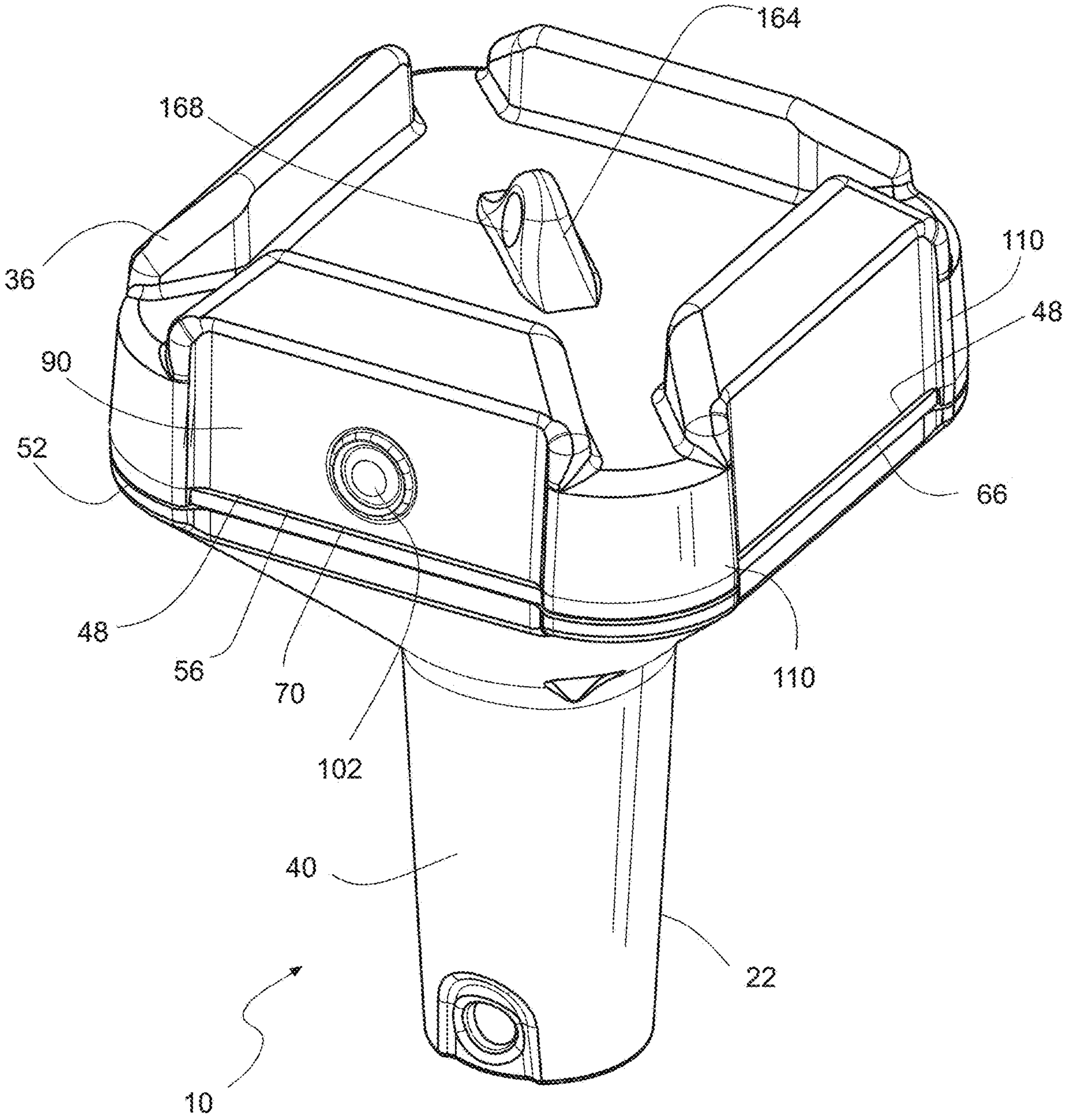
FIG. 1 is a perspective view of an example of a pole mounted lantern, in accordance with one embodiment.
Figure 2:
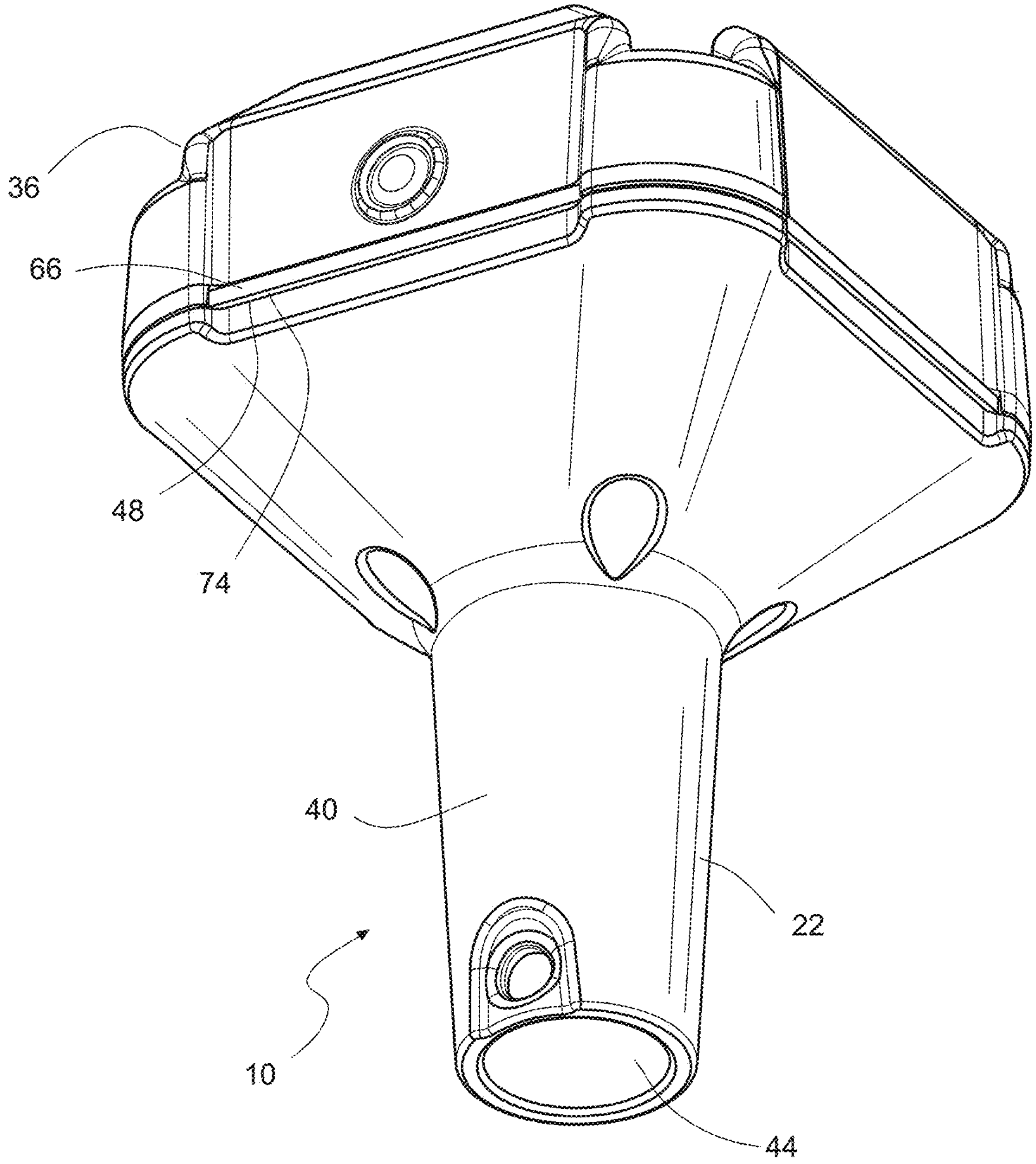
FIG. 2 is a perspective view of the pole mounted lantern of FIG. 1.
Figure 3:
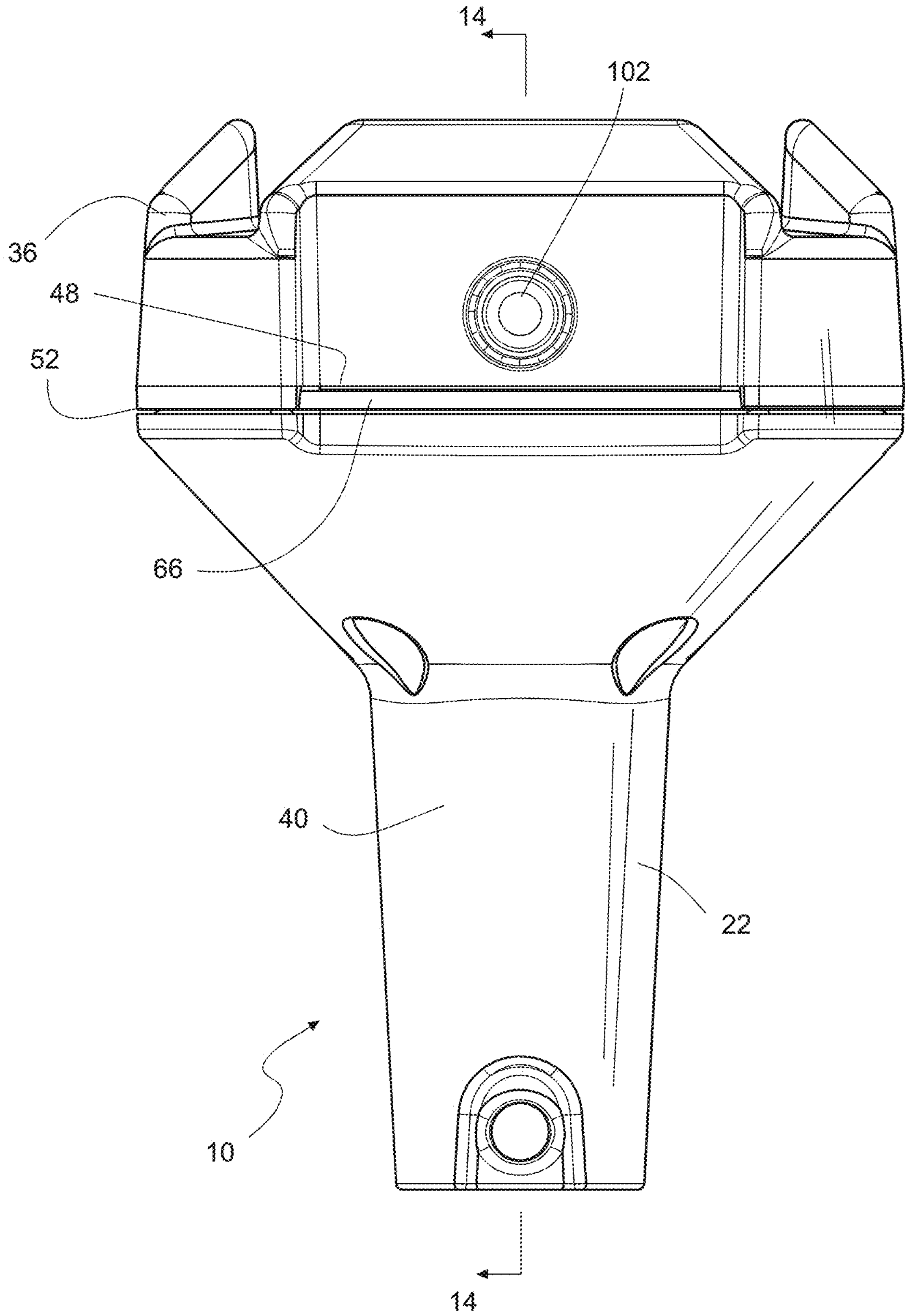
FIG. 3 is a front view of the pole mounted lantern of FIG. 1.
Figure 4:
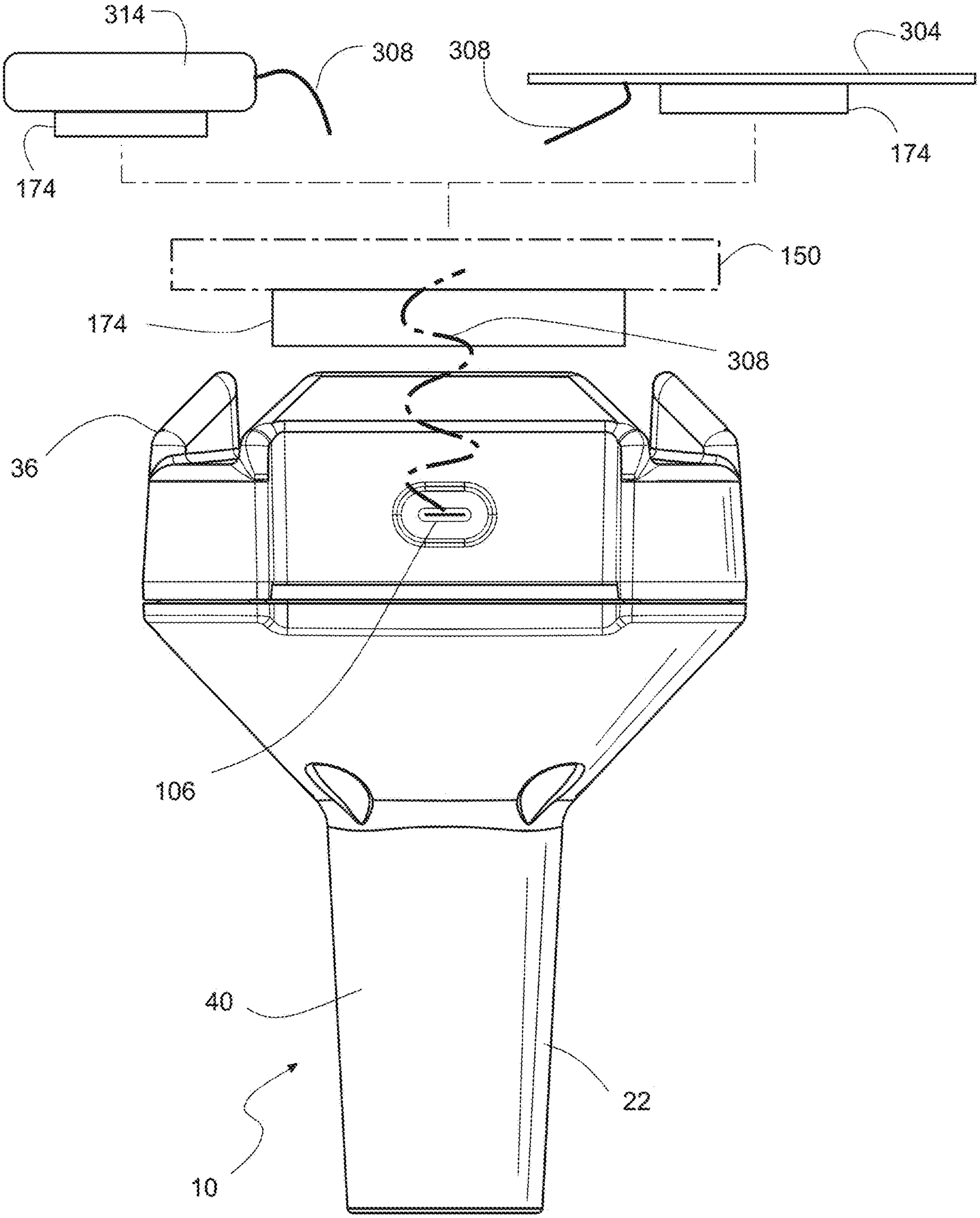
FIG. 4 is a rear view of the pole mounted lantern of FIG. 1, and schematically shows one or more example accessories for coupling to the pole mounted lantern, in accordance with one embodiment.
Figure 5:
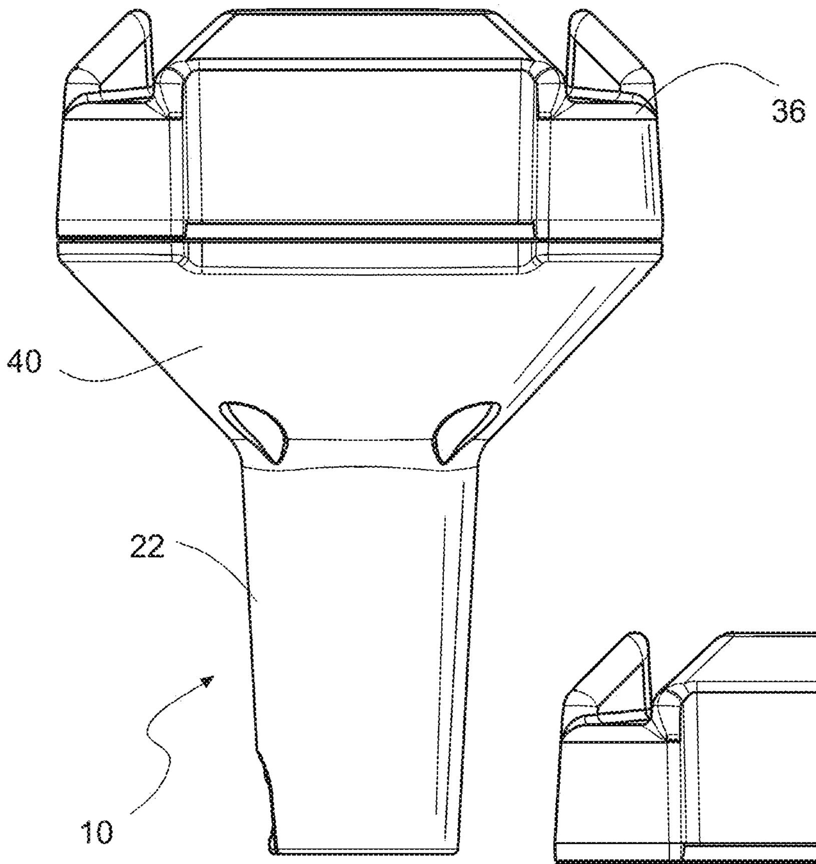
FIG. 5 is a side view of the pole mounted lantern of FIG. 1.
Figure 6:
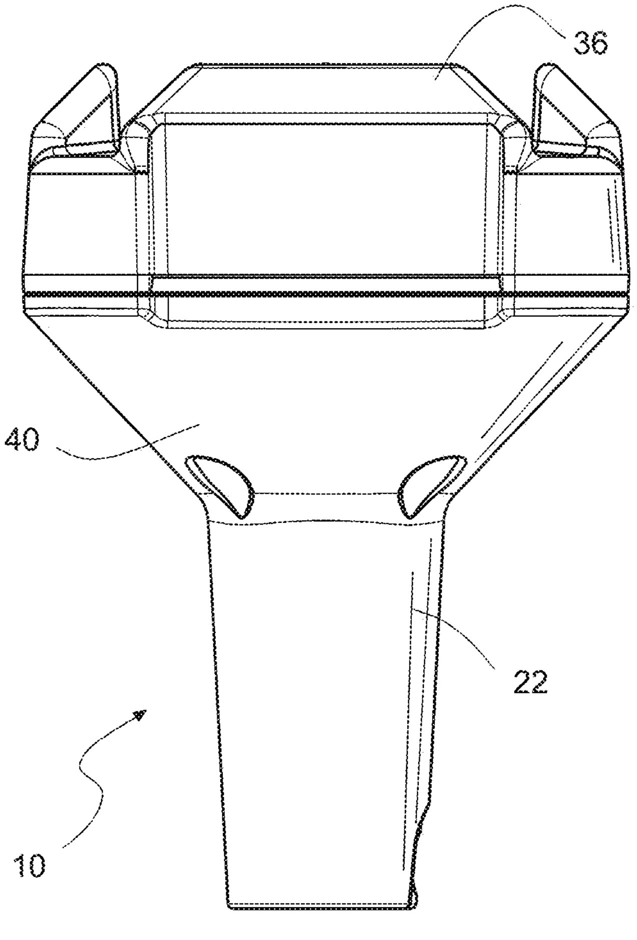
FIG. 6 is another side view of the pole mounted lantern of FIG. 1.
Figure 7:
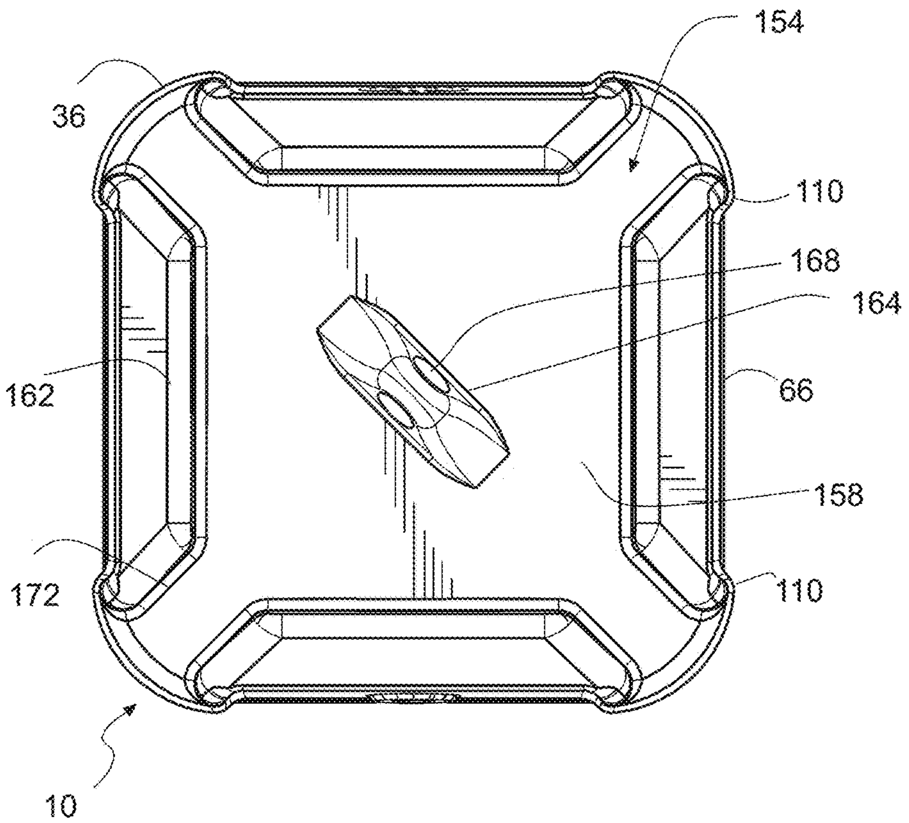
FIG. 7 is a top view of the pole mounted lantern of FIG. 1.
Figure 8:
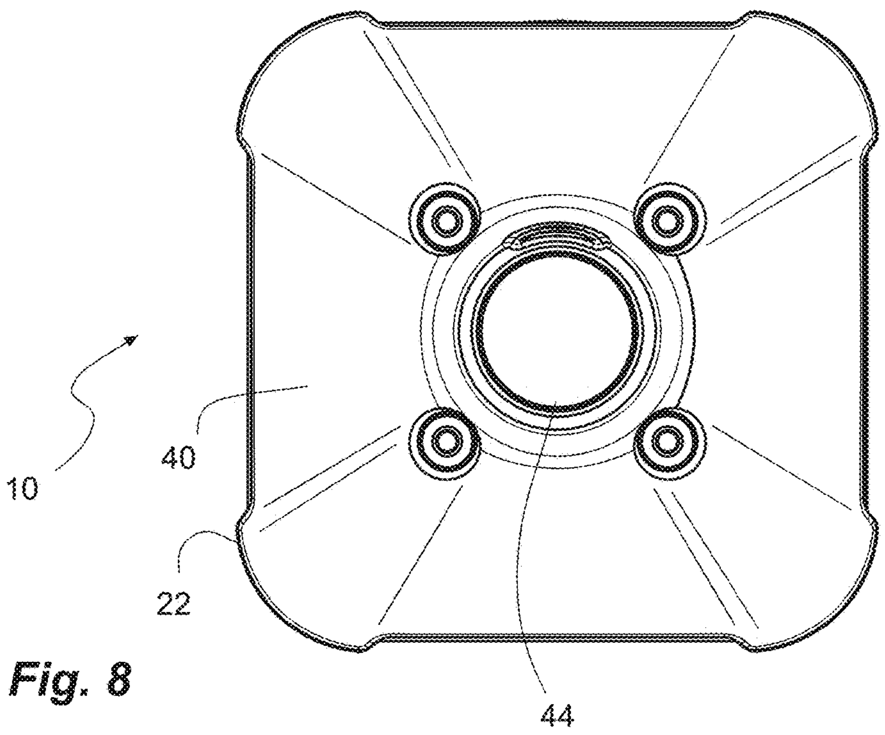
FIG. 8 is a front view of the pole mounted lantern of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

The invention provides a pole mounted lantern that can be elevated to provide overhead area illumination for a larger area, such as for camping overlanding, RVing, outdoor cooking, backyard sports and other nighttime activities, while reducing glare and drawing away insects from the area. The lantern can be elevated on a telescoping pole and stabilized by a tripod. The lantern can have a rechargeable battery and a high-power USB-C power port. The lantern can also be used for emergency preparedness (power outages), home improvement and construction projects.

The lantern and the pole and tripod can collapse to a smaller length, such as approximately 33 to 37 inches, and can extend to a larger length, such as approximately 8 to 9 feet. The lantern can provide 360-degree light coverage up to a 40 foot area with an adjustable brightness between 60 or 80 lumens to 800, 1200 or 2000 lumens.

In addition, the lantern can provide heat dissipation for LED light source by conducting heat away from the LEDs inside the lantern to ambient conditions outside the lantern while providing a water-resistant enclosure for the LEDs, battery and electronics. Furthermore, the lantern can be configured to support accessories, such as a solar panel, a supplemental battery, a motion sensor, etc. The accessory can be releasably mounted to a top of the lantern.

Figure 9:
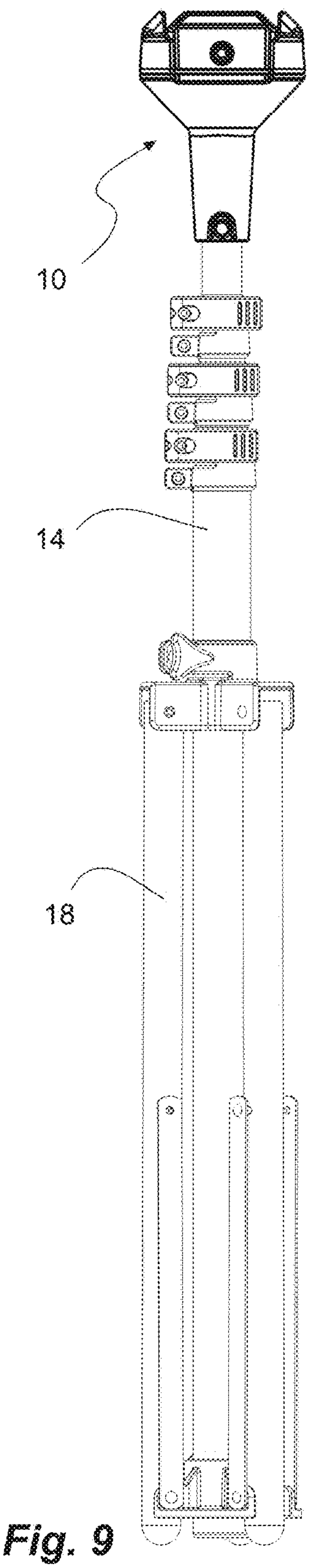
FIG. 9 is a front view of the pole mounted lantern of FIG. 1, shown on an example pole of an example tripod in a collapsed and lowered configuration, in accordance with one embodiment.
Figure 10:
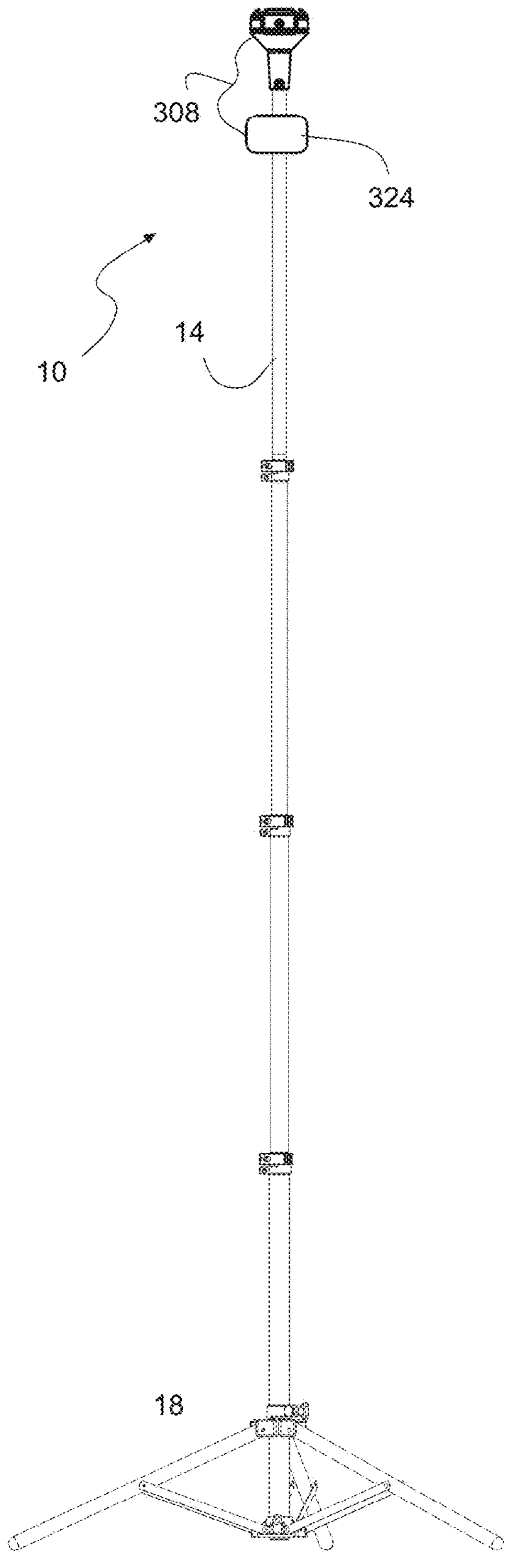
FIG. 10 is a front view of the pole mounted lantern of FIG. 1, shown on the pole of the tripod in an expanded and raised configuration.
Figure 11:
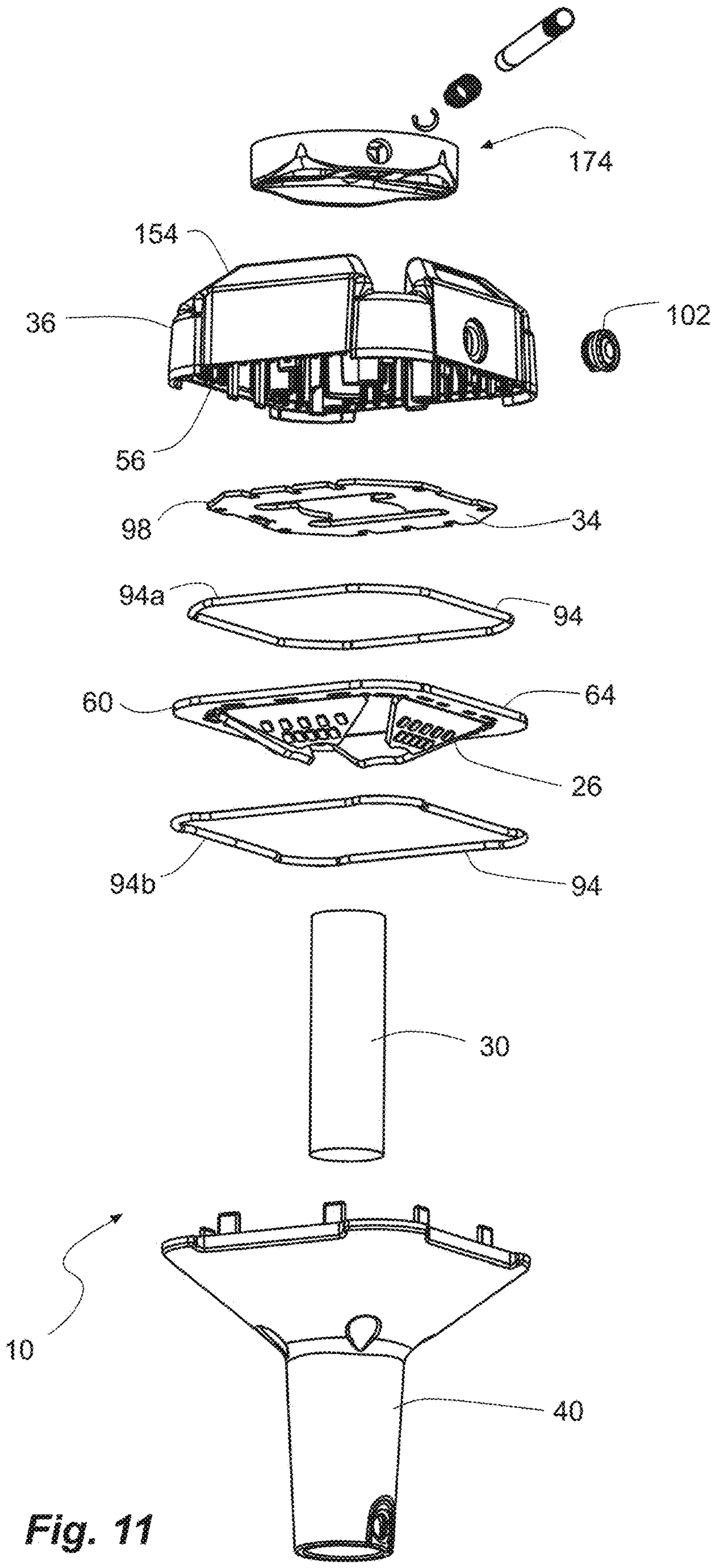
FIG. 11 is an exploded perspective view of the pole mounted lantern of FIG. 1.
Figure 12:
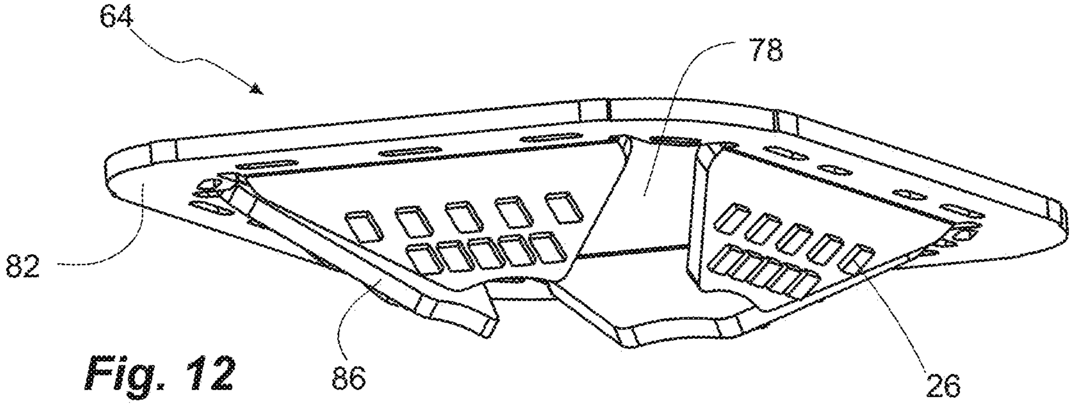
FIG. 12 is a perspective view of an example circuit board with LEDs of the pole mounted lantern of FIG. 1, in accordance with one embodiment.
Figure 13:
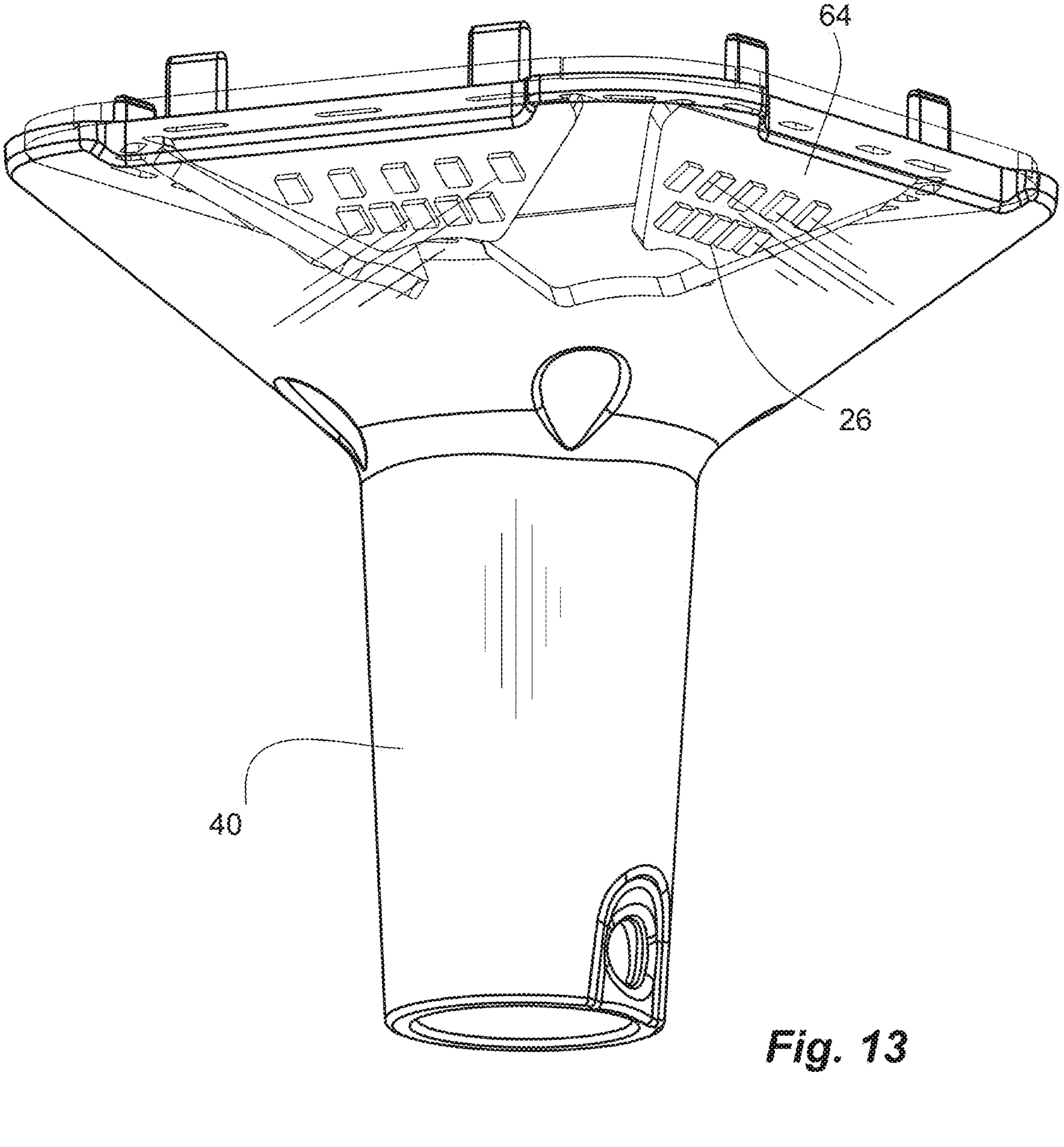
FIG. 13 is a perspective view of an example lens and the circuit board of the pole mounted lantern of FIG. 1, in accordance with one embodiment.
Figure 14:
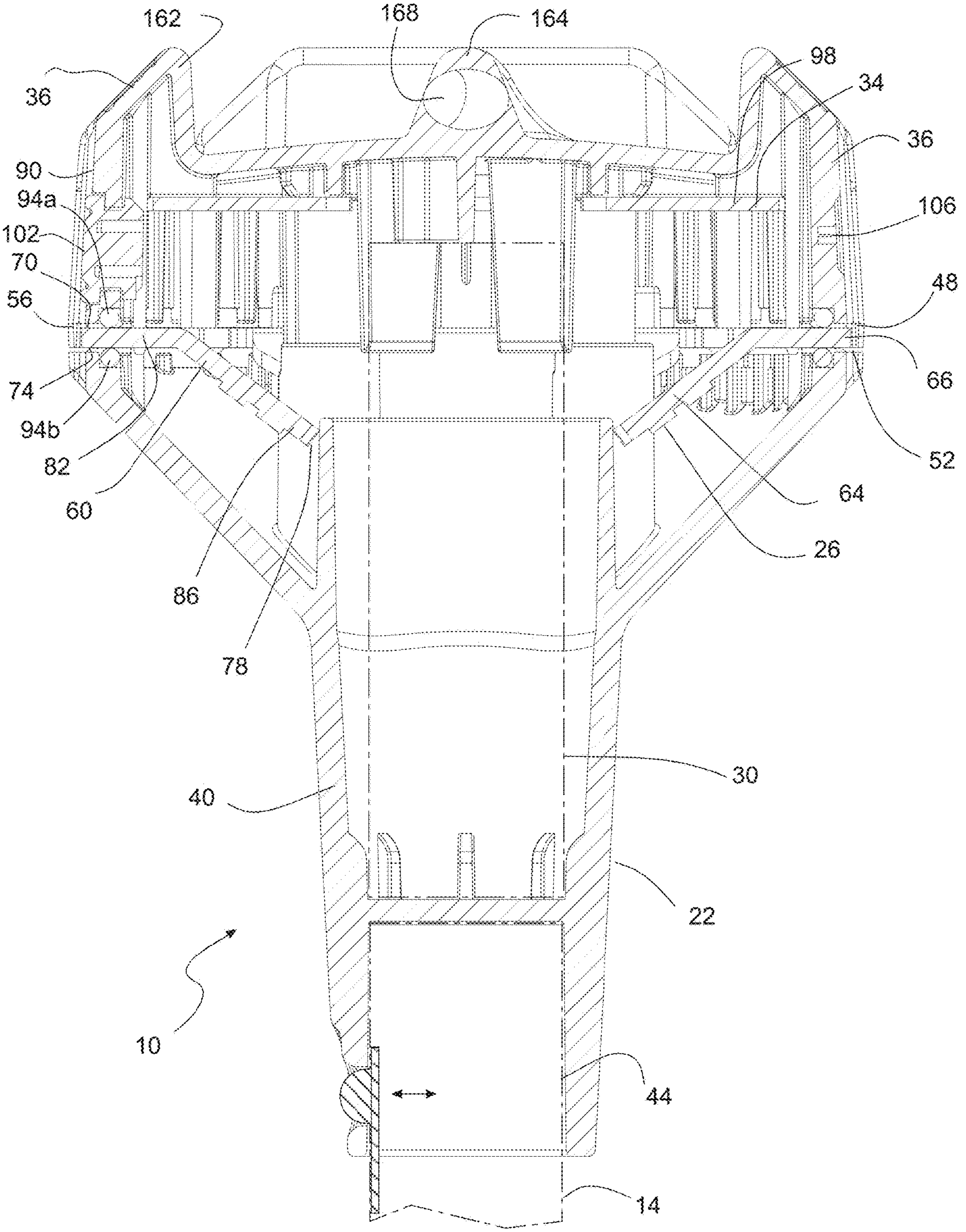
FIG. 14 is a cross-sectional side view of the pole mounted lantern of FIG. 1, taken along line 14 of FIG. 3.
Figure 15:
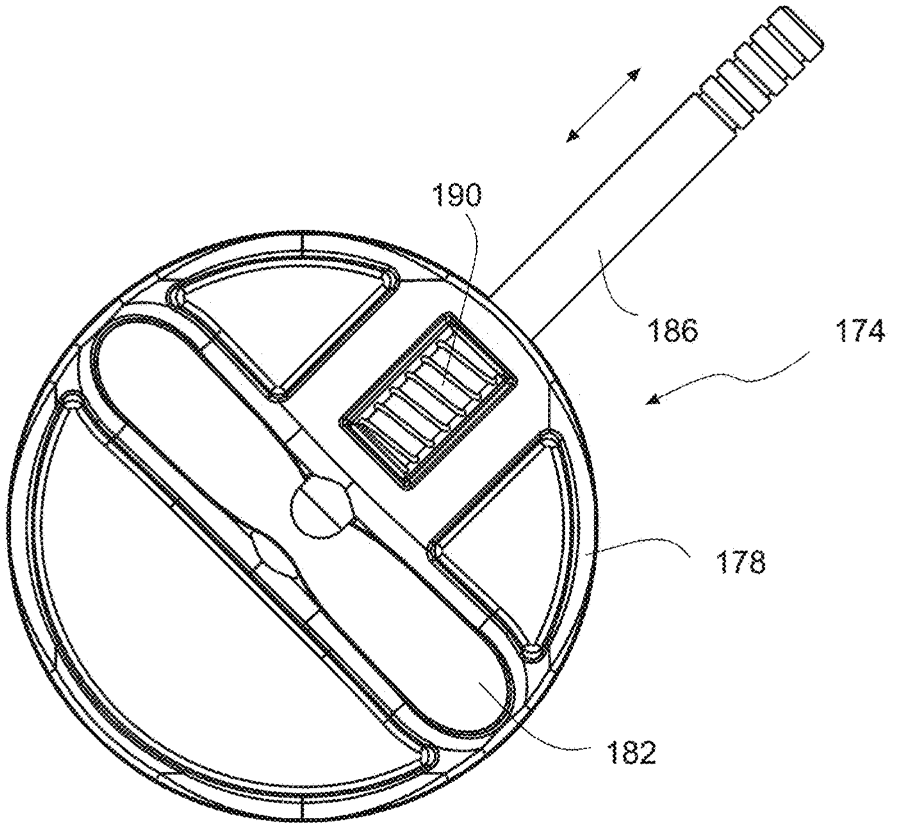
FIG. 15 is a bottom view of an example attachment of an accessory of the pole mounted lantern of FIG. 1, in accordance with one embodiment.
Figure 16:
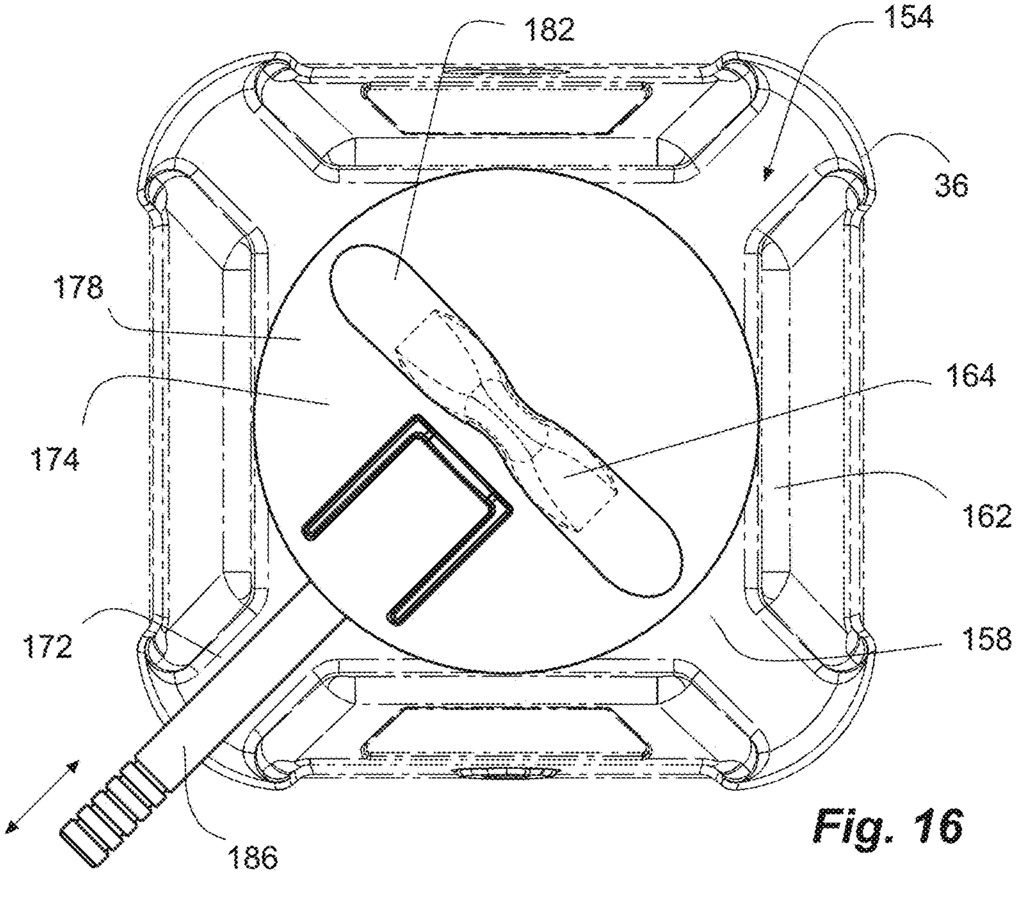
FIG. 16 is a top schematic view of an attachment of the pole mounted lantern of FIG. 1, in accordance with one embodiment.
Figure 17:
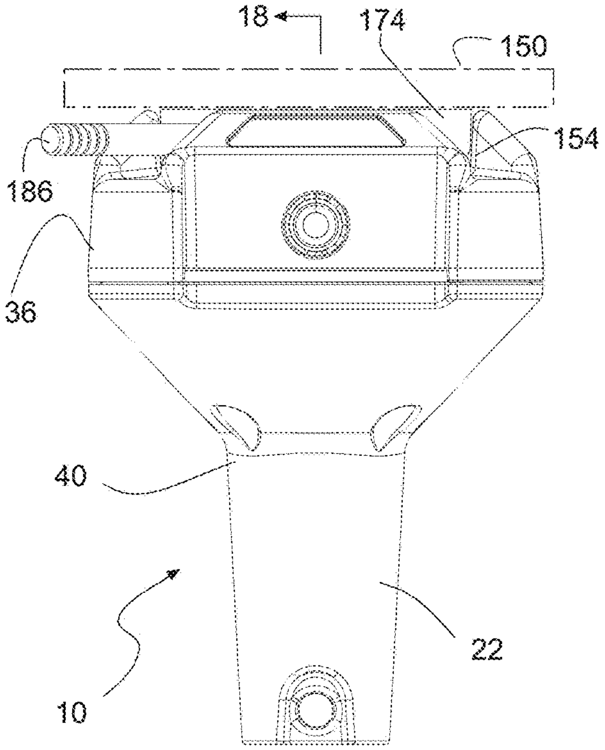
FIG. 17 is a front view of the pole mounted lantern of FIG. 1, shown with an example attachment of an accessory in accordance with one embodiment.
Figure 18:
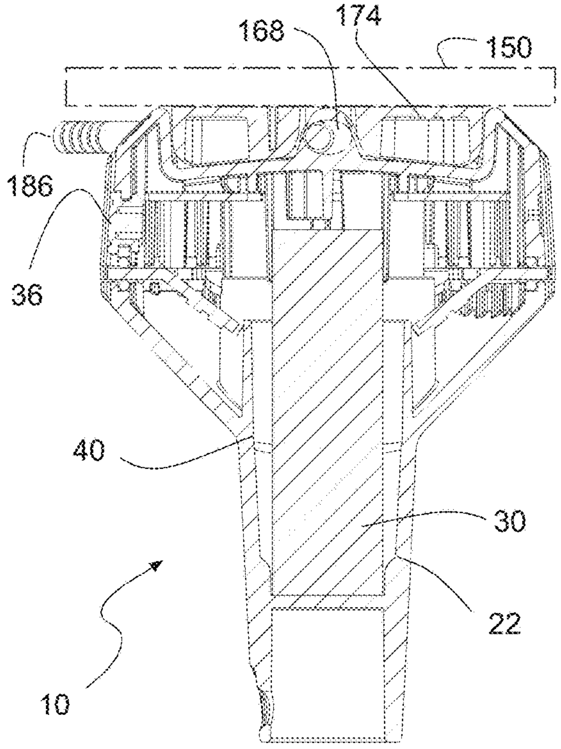
FIG. 18 is a cross-sectional side view of the pole mounted lantern of FIG. 1, taken along line 18 of FIG. 17.
Figure 19:
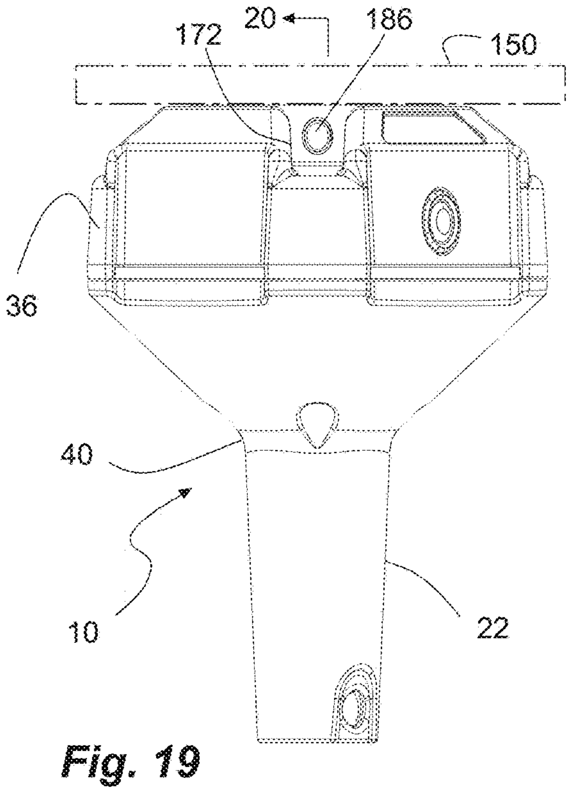
FIG. 19 is an angled side view of the pole mounted lantern of FIG. 1, shown with the example attachment of the accessory.
Figure 20:
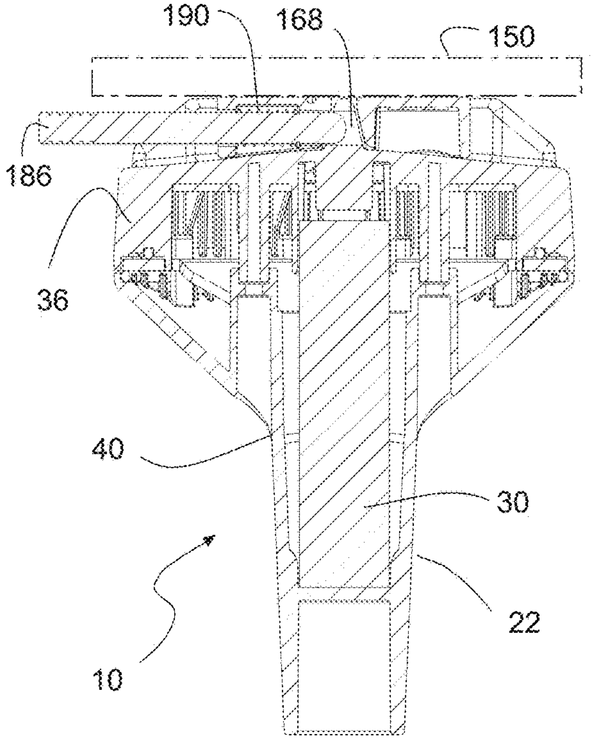
FIG. 20 is a cross-sectional angled side view of the pole mounted lantern of FIG. 1, taken along line 10 of FIG. 19.

Referring to FIGS. 1-14, an example pole-mounted lantern 10 is shown. The lantern 10 can be mounted on a vertical pole 14, as shown in FIG. 10. The pole 14 can be oriented vertically in use, and horizontally or another orientation when collapsed and stored. The pole 14 can be supported on a tripod 18, as shown in FIG. 10. The pole and the tripod can be collapsed, as shown in FIG. 9, and extended, as shown in FIG. 10. The extended height of the lantern 10 can be between 8 and 9 feet. Elevating the lantern 10 can draw insects away from people and work surfaces. Supporting the lantern 10 on the pole 14 can allow the lantern to provide 360-degree light coverage.

The lantern 10 can have a lantern housing 22 mounted on a top of the pole 14. The lantern housing 22 can contain a light source, such as a plurality of light emitting diodes (LEDs) 26 (FIGS. 11-14), a power source, such as a rechargeable battery 30 (FIGS. 11 and 14), and control electronics 34 (FIGS. 11 and 14) associated with controlling battery charging, and LED function, such as brightness, number, etc. The lantern housing 22 can have a cap 36 with a top. A lens 40 can form a bottom of the lantern housing 22. The lantern housing 22 and the lens 40 can have a bore 44 to receive the pole 14. The lens 40 can be at least light translucent, in one aspect, and light transparent in another aspect, to allow light from the lantern housing 22. Forming a bottom of the lantern housing 22 with the lens 40 can help dissipate light and reduce parts.

A slot 48 can extend through the lantern housing 22 between the cap 36 and the lens 44. In one aspect, a seam 52 can be formed between an interface between the cap 36 and the lens 40. The slot 48 can be formed by the seam 52 between the cap 36 and the lens 40. In one aspect, the slot 48 can be formed by a notch 56 in the cap 36 at the seam 52. In another aspect, the slot 48 can be formed by a notch in the lens 40 or the bottom of the lantern housing 22 at the seam 52. In another aspect, the slot 48 can be formed by opposing notches in both the cap 36 and the leans 40 or the bottom of the lantern housing 22 at the seam 52.

In one aspect, the lantern housing 22 can have multiple slots 48 that can substantially circumscribe the lantern housing 22. In another aspect, the lantern housing 22 can have a substantially square shape in plan view (FIGS. 7 and 8) with four sides. The slot 48 can comprise four slots 48, with a slot 48 in each of the four sides. Thus, the slots 48 can extend around the lantern housing 22 and can face in multiple outward directions. In another aspect, the lantern housing 22 can have a single slot 48. In another aspect, the slot 48 can circumscribe the lantern housing 22.

A member 60 can be located at least partially in the lantern housing 22 to carry a plurality of light emitting diodes (LEDs) 26 inside of the lantern housing 22. In one aspect, the member 60 can be a circuit board 64. The circuit board 64 can be a printed circuit board and can support electrical components, such as the LEDs 26, mechanically while also providing electrical connections to the electrical components and the LEDs 26. The circuit board 64 can be formed of a non-conductive board, e.g. a plastic and fiberglass board, with conductive traces extending between the electrical components. The circuit board 64 can also have holes for mounting the electrical components and/or receiving leads from the electrical components.

The member 60 and the circuit board 64 can have a portion 66 extending to the slot(s) 48 and exposed to an exterior of the lantern housing 22 and ambient conditions outside of the lantern housing 22. The member 60 and the circuit board 64 can be configured to conduct heat from the LEDs 26 inside the lantern housing 22 and out of the lantern housing 22 through the slot(s) 48. In one aspect, a perimeter edge 66 of the member 60 and the circuit board 64 can be exposed through the slot 48. In another aspect, an upper surface 70 (FIG. 1) and a lower surface 74 of the member 60 and the circuit board 64 at the perimeter edge 66 can be exposed through the slot 48. An increased surface area exposed through the slot 48 can increase the heat transfer from the member 60 and the circuit board 64 to the air surrounding the lantern housing 22.

The circuit board 64 can have an aperture 78 therethrough. The aperture 78 can be central in the circuit board 64. A perimeter flange 82 can circumscribe the aperture 78. Inner tabs 86 can extend inwardly from the perimeter flange 82. In one aspect, the circuit board 64 can have four inner tabs 86 that can be oriented orthogonal to proximal sides and parallel with opposite sides. The LEDs 26 can be positioned on and carried by the inner tabs 86. The inner tabs 86 can be inclined at an angle with respect to the perimeter flange 82. Thus, the inner tabs 86 can extend downward and inward. The inner tabs 86 can orient the LEDs 26 to face outwardly and downwardly with respect to the lantern housing 22 and the vertical pole 14. In one aspect, the LEDs 26 can be oriented to face downwardly and outwardly at an angle of substantially 37 degrees with respect to vertical.

A perimeter edge 66 of the circuit board 64 can extend through the slot(s) 48 and beyond a perimeter wall 90 of the lantern housing 22. The perimeter flange 66 of the circuit board 64 can be positioned at the slot(s) 48 and exposed in the multiple outward directions. The multiple slots 48 can increase a surface area of the circuit board 64 exposed through the slots 48 and can increase the heat transfer from the circuit board 64 to the air surrounding the lantern housing 22. In addition, multiple portions or sides of the circuit board 64 exposed in multiple directions may position the portions or sides of the circuit board 64 exposed to an air flow to provide convection heat transfer and further increase heat transferred from the circuit board 64.

A seal 94 can be positioned between the lantern housing 22 and the portion 66 of the member 60 and circuit board 64 at the slot(s) 48. The seal 94 can resist water from entering the lantern housing 22 and can protect the LEDs 26, the battery 30 and the control electronics 34. In one aspect, the seal 94 can comprise upper and lower seals **94*a* and 94*b*, such as compressible seals or o-rings, at upper and lower sides 70 and 74 of the perimeter flange 82 of the circuit board 64. The upper seal 94*a* can be sandwiched between the cap 36 and the perimeter flange 82 of the circuit board 64. The lower seal 94*b* can be sandwiched between the perimeter flange 82 of the circuit board 64 and the lens 40 or bottom of the lantern housing 22. The upper and lower seals 94*a* and 94*b* can be retained in annular grooves in the cap 36 and the lens 40 or bottom of the lantern housing 22**, respectively.

The battery 30 can be located in the lantern housing 22. In one aspect, the battery 30 can extend from the lens 40 or the bottom of the lantern housing 22 to the cap 36. In addition, the battery 30 can extend through the aperture 78 of the circuit board 64. Thus, the lantern housing 22, the lens 40, and the circuit board 64 can be configured to accommodate a larger battery for increased operation time. The battery 30 can be electrically coupled to the LEDs 26 and other electrical components on the circuit board 64, and to control electronics 34. The control electronics 34 can be carried by another circuit board 98 which can be carried by and positioned in the cap 36.

One or more buttons 102 can be carried by the lantern housing 22, the cap 36 and the lens 40 or bottom of the lantern housing 22. The buttons 102 can be coupled to the control electronics 34 to operate the Lantern 10 and the LEDs 26.

In addition, a power port 106 (FIGS. 4 and 14) can be carried by the lantern housing 22, the cap 36 and the lens 40 or bottom of the lantern housing 22. The power port 106 can be electrically coupled to the rechargeable battery 30 to charge the battery. In addition, the power port 106 can be coupled to control electronics 34 to receive a control signal through the power port 106 to selectively operate the lantern 10 and/or the LEDs 26. Thus, the power port 106 can also be a data or communication port. The lantern 10 and the LEDs 26 can have multiple modes of operation, including power/light, level/intensity, directional output by selectively energizing select LEDs, etc.

In another aspect, the lantern 10 can be configured to selectively direct light. For example, the light can be directed entirely around the lantern 10 in 360 degrees. As another example, the light can be directed in a single direction, such as 90 degrees. As another example, the light can be directed in opposite directions, such as 90 degrees in one direction and 90 degrees in the opposite direction. Thus, the LEDs 26 can be grouped in separate and discrete faces and oriented to face in different directions. Each face can have an array or a matrix of LEDs 26. In one aspect, four faces or groups can be provided on four sides of the lantern 10 and oriented orthogonally or perpendicularly to adjacent faces or groups, and parallel with opposite faces or groups. The groups can be selectively lit, such as all faces for 360-degree circumferential light distribution, opposite faces, or a single face for directional light distribution.

In another aspect, the lantern housing 22, the cap 36 and the lens 40 or the bottom of the lantern housing 22 can have bumpers 110 extending from corners of the top and the cap 36 and the lens 40 of the lantern housing 22, and on opposite lateral sides of the slot(s) 48 and the exposed member 60 and the circuit board 64 to protect the member 60 and the circuit board 64.

Referring to FIGS. 4 and 15-20, the lantern 10 and the lantern housing 22 can be configured to carry an accessory, indicated generally at 150, and to provide a connector 154 to releasably secure and mount the accessory 150. The lantern 10 and the lantern housing 22 can have a connector 154 on the top of the lantern housing 22 and the cap 36. The connector 154 can comprise a recess 158 at the top of the lantern housing 22 and the cap 36. The recess 158 can be formed between one or more ridges 162 circumscribing the top of the cap 36. Thus, the cap 36 can be a crown. In one aspect, the lantern 10 and the lantern housing 22 can be removed from the pole 14, inverted and placed on a support surface. A fin 164 can be positioned in the recess 158. The fin 164 can extend vertically upward. An aperture 168 can extend through the fin 164 in a horizontal orientation. In one aspect, the lantern 10 and the lantern housing 22 can be removed from the pole 14 and suspended pendant from a line or hook received in the horizontal aperture 168 in the fin 164. A notch 172 can be formed in the top of the lantern housing 22 or the cap 36, such as between proximate ridges 162. The notch 172 can extend to the recess 158 and can aligned with the aperture 168 in the fin 164.

The accessory 150 can have a mating connector 174 releasably engaging the connector 154 of the lantern housing 22. The mating connector 174 can comprise a protrusion 178 extendable into the recess 158 of the connector 154 of the lantern housing 22. A slot 182 can be formed in the protrusion 178. The slot 182 can be sized and shaped to receive the fin 164. The slot 182 and the fin 164 can resist rotational movement of the connector 154 and matting connector 174, and thus the accessory 150 and the lantern 10. A pin 186 can be slideable with respect to the slot 182. The pin 186 can selectively slide into and out of the aperture 168 in the fin 164. The pin 186 can extend into the aperture 168 in the fin 164 to secure the matting connector 174 to the connector 154. The pin 186 can be withdrawn from the aperture 168 to remove the accessory 150 from the lantern 10. The pin 186 can biased into the aperture 168 of the fin 164, such as with a spring 190. The pin 186 can extend at least to the notch 172 so that it can be engaged and withdrawn.

The accessory 150 can comprise a solar panel 304 (FIG. 4) with an electrical cord 308 extending to the power port 106 carried by the lantern 10. Thus, the solar panel 304 can charge the rechargeable battery 30. In one aspect, the solar panel 304 can be flush with the top of the lantern 10 and oriented substantially horizontally.

The accessory 150 can comprise a supplemental battery 314 (FIG. 4) with an electrical cord 308 extending to a power port 106 carried by the lantern 10. The supplemental battery 314 can extend the useful operational time of the lantern 10. In one aspect, the supplemental battery 314 can be positioned atop the lantern 10. In another aspect, the supplemental battery 314 can be positioned below a top of the lantern 10 with a connector extending from the supplemental battery 314 to the connector 154 atop the lantern 10. In another aspect, the supplemental battery 314 can carry a solar panel 304 with a similar connector 154 and matting connector 174 therebetween.

The accessory 150 can comprise a motion sensor 324 (FIG. 10) with an electrical cord 308 extending to a power port 106 carried by the lantern 10. The motion sensor 324 and the lantern 10 can be configured to illuminate when the motion sensor 324 detects motion. The motion sensor 324 can be coupled to the pole 14, as shown in FIG. 10.

The accessory can comprise a wireless (e.g. Bluetooth) speaker. Thus, the lantern can provide both light and sound, such as music. In one aspect, the wireless speaker can have an electrical cord extending to a power port carried by the lantern. Thus, the lantern or the rechargeable battery can also power the wireless speaker.

The accessory can comprise a camera. In one aspect, the camera can have an electrical cord extending to a power port carried by the lantern. Thus, the lantern or the rechargeable battery thereof can also power the camera. In another aspect, the camera can comprise a motion sensor to operate when the sensor detects motion. The camera can take photographs and/or video. In another aspect, the camera can be wireless to transmit the photographs and/or video. Thus, the lantern and camera can be located remotely. In another aspect, the camera can be a 360-degree camera for capturing 360 degree view.

The accessory can comprise a projector. The projector can be wireless and can project an image, such as video, to a screen. In one aspect, the projector can have an electrical cord extending to a power port carried by the lantern. Thus, the lantern or the rechargeable battery thereof can also power the projector.

The accessory can comprise a light, such as a supplemental light. In one aspect, the light can be a spot light or unidirectional light. In another aspect, the light can be a light string.

The accessory can comprise a wireless controller with an electrical cord extending to a power port carried by the lantern. The wireless controller can have a receiver (e.g. Bluetooth) configured to receive a signal from a remote control to control the LEDs. The remote control can be a cellular/smart phone with an app to send a wireless signal (e.g. Bluetooth).

The accessory can comprise a concave hood to block light from transmitting upwardly. The hood can extend from the top of the lantern outwardly and downwardly with a distal perimeter below a horizontal level of the LEDs.

In another aspect, the LEDs can be carried by a heat-sink. The heat-sink can help transfer head generated by the LEDs away from the LEDs. In one aspect, the heat-sink can extend from the LEDs inside the housing or body, to a location outside the housing or body and exposed to ambient conditions or the environment. Thus, at least a portion of the heat-sink can be exposed outside of the housing or body to transfer heat out of the housing or body. In one aspect, the heat-sink can have a substantial mass, much greater than a mass of the LEDs, and even on the order of the mass of the battery, to better absorb heat. In one aspect, the heat-sink can be formed of metal, such as aluminum, and can be formed by casting. In another aspect, the heat-sink can be formed of sheet metal, such as sheet aluminum, and can be formed by stamping and forming. In another aspect, the heat-sink can comprise or can be formed of a thermal conductive polymer (TCP) (e.g. CoolPoly®). The polymer can be molded and cured to a desired shape. In another aspect, the LEDs can be mounted on a circuit board, and the circuit board can be mounted to the heat-sink.

In another aspect, the plurality of LEDs can be mounted directly on the heat-sink without any intervening circuit board. Mounting the LEDs directly to the heat-sink can improve heat transfer away from the LEDs. The heat-sink can have an insulative layer or film, such as an insulative paint, on the heat-sink and between the heat-sink and the LEDs. Electrical traces can be located directly on the heat-sink or the insulative paint thereof. In one aspect, the LEDs can be electrically coupled to the heat-sink and the electrical traces so that the heat-sink itself forms part of an electrical path or circuit with the LEDs.

In another aspect, the top of the lantern housing and the cap can be the heat-sink and the LEDs can be thermally coupled to the top and the cap. In another aspect, the top and the cap can comprise a thermal conductive polymer (TCP) (e.g. CoolPoly®). In another aspect, the top and the cap can comprise heat transfer fins.

In another aspect, the lantern can have at least one light filter removably couplable over the lens. The at least one light filter can be at least translucent and can have a different color different than a color of the lens. In one aspect, a set of different colored light filters can be provided to selectively cover the lens and the LEDs. The light filters can change a color and effect of the light. For example, one light filter can be amber and another can be red. In one aspect, the lantern can have an exterior ridge, such as a protrusion of the member, the circuit board, or the heat-sink. The light filter can have an interior tab engaging the exterior ridge to maintain the light filter on the housing or body and over the lens. The filter can have a shape matching the lens and disposable over the lens including a bottom aperture receiving the pole therethrough and an upper aperture receiving the top of the lantern.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A pole mounted lantern, comprising:
a) a vertical pole;
b) a lantern housing mounted on a top of the vertical pole, the lantern housing having a bottom with a bore to receive the vertical pole and a top;
c) a battery located in the lantern housing;
d) light emitting diodes (LEDs) located inside of the lantern housing and electrically coupled to the battery;
e) a lens associated with the lantern housing and circumscribing the LEDs, the lens being at least light translucent;
f) a connector on a top of the lantern housing, the connector comprising:
i) a recess at the top of the lantern housing;
ii) a fin in the recess;
iii) an aperture in the fin; and
iv) a notch in the top of the lantern housing, extending to the recess and aligned with the aperture in the fin;
g) an accessory carried by the lantern housing and mounted to the top of the lantern housing; and
h) the accessory having a mating connector releasably engaging the connector of the lantern housing, the mating connector comprising:
i) a protrusion extendable into the recess of the connector of the lantern housing;
ii) a slot in the protrusion and sized and shaped to receive the fin;
iii) a pin slideable with respect to the slot and into and out of the aperture in the fin;
iv) the pin biased into the aperture of the fin; and
v) the pin extending at least to the notch.

2. The pole mounted lantern in accordance with claim 1, wherein the accessory further comprises a supplemental battery.

3. The pole mounted lantern in accordance with claim 2, further comprising:
a power port carried by the lantern housing; and
an electrical cord extending from the supplemental battery to the power port.

4. The pole mounted lantern in accordance with claim 2, wherein the supplemental battery is positioned atop the lantern housing.

5. The pole mounted lantern in accordance with claim 1, wherein:
the battery is a rechargeable battery; and
the accessory further comprises a solar panel.

6. The pole mounted lantern in accordance with claim 5, further comprising:
a power port carried by the lantern housing; and
an electrical cord extending from the solar panel to the power port.

7. The pole mounted lantern in accordance with claim 5, wherein the solar panel is positioned atop the lantern housing.

8. The pole mounted lantern in accordance with claim 1, further comprising:
the accessory further comprises a supplemental battery; and
the accessory further comprises a solar panel.

9. The pole mounted lantern in accordance with claim 1, wherein the accessory further comprises a motion sensor.

10. The pole mounted lantern in accordance with claim 1, further comprising:
a power port carried by the lantern housing;
a motion sensor carried by the lantern housing or the vertical pole; and
an electrical cord extending from the motion sensor to the power port.

11. A pole mounted lantern, comprising:
a) a vertical pole;
b) a lantern housing mounted on a top of the vertical pole, the lantern housing having a bottom with a bore to receive the vertical pole a connector on a top of the lantern housing, the connector comprising:
i) a recess at the top of the lantern housing;
ii) a fin in the recess;
iii) an aperture in the fin; and
iv) a notch in the top of the lantern housing, extending to the recess and aligned with the aperture in the fin;
c) a battery located in the lantern housing;
d) light emitting diodes (LEDs) located inside of the lantern housing and electrically coupled to the battery;

e) a lens associated with the lantern housing and circumscribing the LEDs, the lens being at least light translucent; and f) an accessory releasably mounted to the top of the lantern housing.

12. The pole mounted lantern in accordance with claim 11, further comprising:

a mating connector of the accessory releasably engaging the connector of the lantern housing.

13. The pole mounted lantern in accordance with claim 11, further comprising:

the accessory having a mating connector releasably engaging the connector of the lantern housing, the mating connector comprising:

i) a protrusion extendable into the recess of the connector of the lantern housing;

ii) a slot in the protrusion and sized and shaped to receive the fin;

iii) a pin slideable with respect to the slot and into and out of the aperture in the fin;

iv) the pin biased into the aperture of the fin; and v) the pin extending at least to the notch.

14. The pole mounted lantern in accordance with claim 11, further comprising:

a power port carried by the lantern housing;

the accessory further comprises a supplemental battery; and an electrical cord extending from the supplemental battery to the power port.

15. The pole mounted lantern in accordance with claim 14, wherein the supplemental battery is positioned atop the lantern housing.

16. The pole mounted lantern in accordance with claim 11, further comprising:

a power port carried by the lantern housing;

the battery is a rechargeable battery;

the accessory further comprises a solar panel; and an electrical cord extending from the solar panel to the power port.

17. The pole mounted lantern in accordance with claim 16, wherein the solar panel is positioned atop the lantern housing.

18. The pole mounted lantern in accordance with claim 11, wherein the accessory further comprises a motion sensor.

19. The pole mounted lantern in accordance with claim 11, further comprising:

a power port carried by the lantern housing;

a motion sensor carried by the lantern housing or the vertical pole; and an electrical cord extending from the motion sensor to the power port.

20. An accessory for a pole mounted lantern with a vertical pole, a lantern housing mounted on a top of the vertical pole, light emitting diodes (LEDs) located inside of the lantern housing, a lens associated with the lantern housing, and a connector on a top of the lantern housing with a recess at the top of the lantern housing, a fin in the recess, an aperture in the fin, a notch in the top of the lantern housing extending to the recess and aligned with the aperture in the fin, the accessory comprising:

a mating connector releasably engaging the connector of the lantern housing, the mating connector comprising:

i) a protrusion extendable into the recess of the connector of the lantern housing;

ii) a slot in the protrusion and sized and shaped to receive the fin;

iii) a pin slideable with respect to the slot and into and out of the aperture in the fin;

iv) the pin biased into the aperture of the fin; and v) the pin extending at least to the notch.

* * * * *